A. D. SMITH.
METHOD OF ICE MAKING.
APPLICATION FILED APR. 1, 1920.
1,380,933.
Patented June 7, 1921.
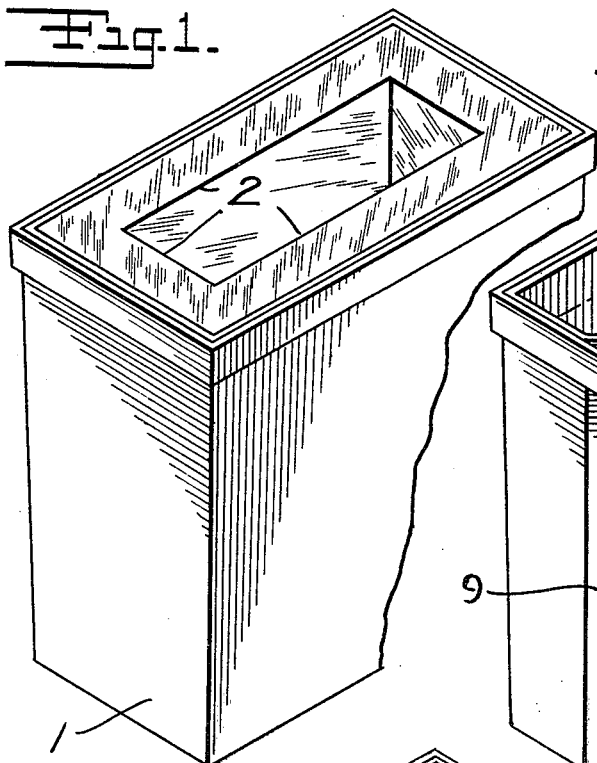
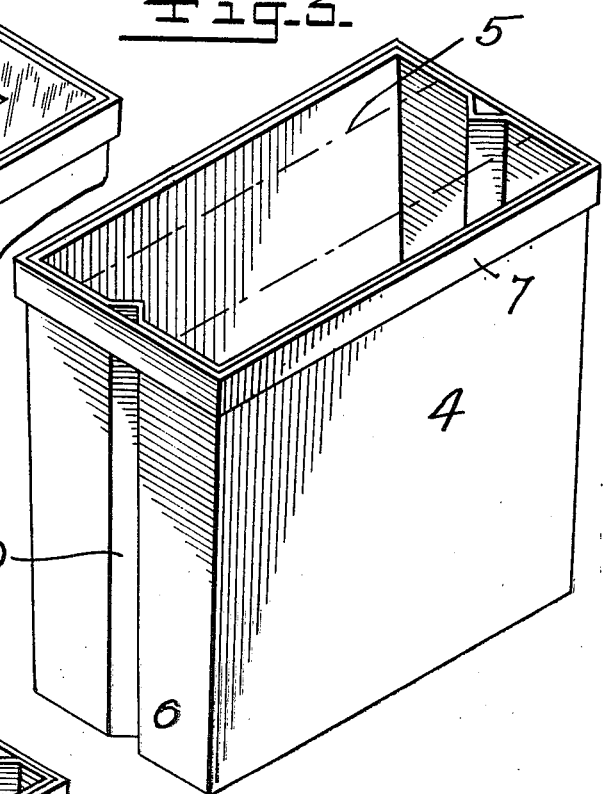
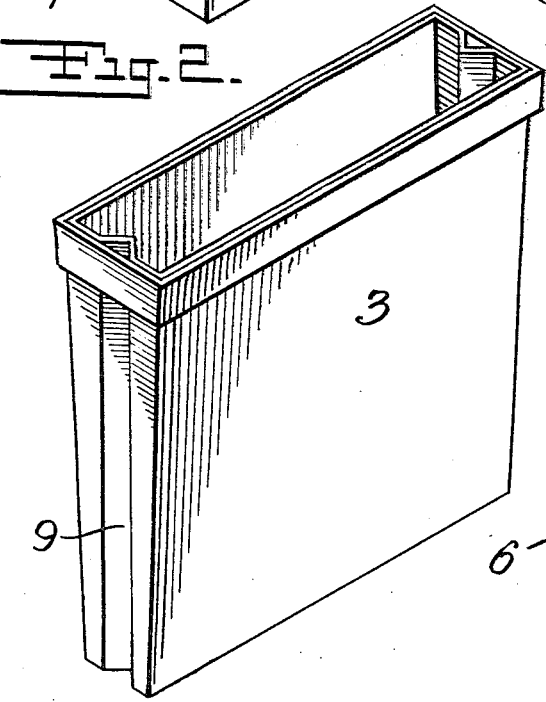
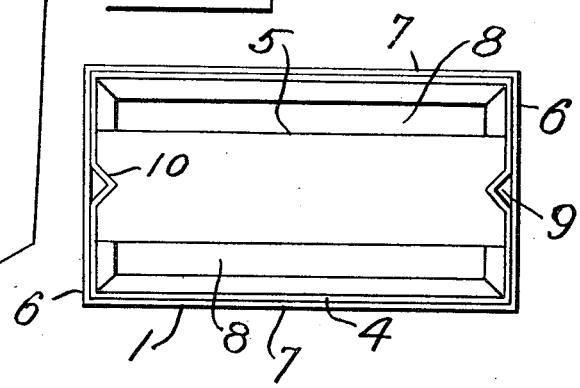
Inventor
ARTHUR D. SMITH
By his Attorney
William F. Nickel

UNITED STATES PATENT OFFICE.

ARTHUR D. SMITH, OF BROOKLYN, NEW YORK, ASSIGNOR TO FRANK H. CZIESLIK, OF BROOKLYN, NEW YORK.

METHOD OF ICE-MAKING.

1,380,933. Specification of Letters Patent. Patented June 7, 1921.

Application filed April 1, 1920. Serial No. 370,484.

*To all whom it may concern:*

Be it known that I, ARTHUR D. SMITH, a citizen of the United States, residing in Brooklyn, in the county of Kings and State of New York, have invented certain new and useful Improvements in Methods of Ice-Making, of which the following is a specification.

I have invented an improved method of ice making, with apparatus for practising same, especially adapted to produce ice for domestic and other uses.

An object of my invention is to provide a method which can easily and conveniently be practised in connection with almost any system of refrigeration now commercially employed; and by which water can be frozen to manufacture ice in a relatively short period of time, and at a comparatively small expenditure of labor and power.

Other objects and advantages of my invention will appear from the following description, taken with the accompanying drawings, forming part of same, and the novel characteristics of my invention are precisely defined in the appended claims. This disclosure, however, is illustrative only, and I may vary the details of what is actually shown and described herein, without departing from the scope and spirit of my invention, to the full extent indicated by the general meanings of the terms in which the claims are expressed.

On the drawings:—

Figure 1 is a perspective view of a container for water to be frozen, such as is commonly employed in making ice, and illustrating some of the conditions which are dealt with by my invention.

Fig. 2 is a similar view of a different container, employed in my invention;

Fig. 3 shows a container similar to that in Fig. 2, but larger; and

Fig. 4 is a top view of the container of Fig. 3, showing the manner in which same is utilized.

The same numerals identify the same parts throughout.

Referring first to Fig. 1, I show thereon an ordinary container 1, which is put to use by being filled with water and then subjected to the action of a refrigerating agent to cause the water to freeze. Such a can or container is generally made of iron, and usually about 21½ inches high, by 11½ inches wide, and 22½ inches long at the mouth. These dimensions are those of a standard can, though of course they may be varied. Such a can, for example, is lowered into a brine tank almost up to its mouth, and after the water in it has been frozen solid, it is treated on its outside with enough heat to loosen the ice, and the cake of ice is then removed by inverting the can and dumping the cake out. To facilitate the removal of the ice, the can is usually made to taper or contract slightly from top to bottom.

Now under practical conditions, when a can of the size mentioned is immersed in a brine solution of say 15° F., the water in the can will freeze first around the four sides. After about 12 hours of immersion, a skin or shell of ice about three inches thick will completely line the inside of the can, as indicated on Fig. 1 by the numeral 2. This shell will of course cover the bottom of the can also to the same depth. To freeze the remaining water in the center of the can, requires a much longer period, which is about 36 hours additional; making 48 hours in all for the whole operation; and during all this time the power plant, which, for example, includes ammonia cooling or expansion coils in the brine, must be kept running to maintain the temperature of the brine constant.

Obviously, then, if the time required to freeze the water at the middle of the can could be saved, a great increase in efficiency and economy would be the result.

In practising my invention, I employ cans such as are illustrated in Figs. 2 and 3; indicated by the numerals 3 and 4. The can 4 has about the same dimensions and shape as the can 1; but the can 3, while tapering a little from top to bottom, is smaller, being about as long at the mouth as the other two, but not over 6 inches wide.

The can 3 is filled with water, immersed in brine, and frozen; the time required being not over 12 hours. I then remove the block of ice from the can 3, and place it in the can 4, the block being indicated at 5. The block 5 is disposed in central position in the can 4, extending from one of the narrower sides 6 to the other; and being in contact therewith from bottom to top, but being separated from the two wider sides 7 by a space 8; which will not be over three inches across. Water is poured into the spaces 8, and the can 4 with the water and the ice 5 is sunk into the brine; and after not more than 12 hours additional the whole body of the contents will be completely congealed into one solid mass. The two steps, therefore, would require only 24 hours, when performed in succession, and this is half the time above mentioned.

In fact, however, I save fully 75 per cent. of the time usually required, because the freezing of the water in the cans 3 and 4 can be done simultaneously. Suppose a battery of cans 3 and a battery or set of cans 4 to be in use. After the smaller cans 3 are filled and frozen the first time they are refilled and immersed into brine; while the blocks 5 from them are in the cans 4; and the latter, with water in the spaces 8, are also in the brine solution. To freeze the cans 4, filled in this way, requires only 12 hours; and during this period the cans 3 are producing a second supply of ice blocks 5. When the cans 4 are ready to be emptied of their ice, the new blocks 5 are ready, and the cans 4 can again be filled with these blocks and water. When they are immersed into the brine a second time, the cans 3, refilled with water, are immersed with them, and the entire operation requires only 12 hours. I can thus produce a given supply of ice with only one-fourth as many cans of the usual size as is generally required, together with an equal number of smaller cans 3, and less than one-half (three-eighths) of the space heretofore needed. The labor of emptying the cans 3 and loading the cans 4 is only a small part as expensive as the cost of operating the machinery for 36 hours longer.

The can 3 is preferably provided with a vertical rib 9, in the middle of each of its narrower sides, and so is the can 4. Then the block 5 of ice will have a pair of longitudinal grooves 10 in each of its smaller lateral faces, to enable it to be fitted into the can 4, and be maintained in central position, so as to keep open the spaces 8. Other expedients and ways of forming the cans 3 and 4 and the ice 5 can be adopted to attain the same ends, as I am by no means restricted to a four-cornered can with the ribs 9, but may practise my invention with cans of any size or shape, and formed in any feasible way to make the larger can receive and hold a block of ice in middle position, with a space or spaces between the ice and its inside surface.

From the foregoing the great saving in expense, the increase in efficiency, and the practical value of my invention will be apparent to those skilled in this art.

Having described my invention, what I believe to be new and desire to secure and protect by Letters Patent of the United States is:

1. A process of making ice which consists in placing a body of water in a can, applying a freezing medium to the exterior of the can, removing the ice cake so formed, placing said cake in a second can having substantially the same configuration as the first can, and substantially the same dimensions, except that the second can is of greater thickness, so that spaces will be left between the opposite faces of the cake and the interior of the second can, filling said spaces with water, and applying a freezing medium to the exterior of said second can until all said water and said ice cake are frozen into a single mass.

2. The process of making ice which consists in placing a body of water in a can and then subjecting the can and the water in it to the action of a freezing medium for the time required to transform the water into an ice cake in said can, the can being provided with longitudinal ribs inside the can to form grooves in the opposite faces of said ice cake, placing said cake in a second can having substantially the same configuration and substantially the same dimensions as the first can, except that the second can is of greater thickness, said second can also having oppositely located ribs on its interior to engage the grooves in the opposite faces of the ice cake, so that when the ice cake is disposed in said second can, spaces will be left between the remaining faces of the cake and the interior of the second can, causing said spaces to be filled with water, and then subjecting the second can with the water and ice cake therein to the action of a freezing medium until the said water and said ice cake are congealed into a single mass.

3. The process of making ice which consists in placing a body of water in a can and then subjecting the can and the water in it to the action of a freezing medium for the time required to transform the water into an ice cake, in said can, removing the ice cake so formed, placing said cake into a second can having substantially the same configuration as the first can and substantially the same dimensions except that the second can is of greater thickness, so that spaces will be left between the opposite faces of the cake and the interior of the second can, causing said spaces to be filled with water and then subjecting the second can with the water and ice cake therein to the action of a freezing medium, until all said water and ice cake are congealed into a single mass.

In witness whereof, I have signed my name to this specification this 30th day of March, 1920.

ARTHUR D. SMITH.